(12) United States Patent
Eglinton (10) Patent No.: US 7,552,961 B2
(45) Date of Patent: Jun. 30, 2009

(54) SHEETING SYSTEM FOR OPEN-TOPPED CONTAINERS

(76) Inventor: Danny John Eglinton, 2 Fairview Crescent, Benfleet, Essex (GB) SS7 4JP ( * ) Notice: Subject to any disclaimer, the term of this patent is extended or adjusted under 35 U.S.C. 154(b) by 385 days.

(21) Appl. No.: 10/581,384

(22) PCT Filed: Nov. 30, 2004

(86) PCT No.: PCT/GB2004/005038

§ 371 (c)(1),
(2), (4) Date: Jun. 2, 2006

(87) PCT Pub. No.: WO2005/053983

PCT Pub. Date: Jun. 16, 2005

(65) Prior Publication Data

US 2008/0191510 A1    Aug. 14, 2008

(30) Foreign Application Priority Data

Dec. 2, 2003    (GB) .................................. 0327890.0
Oct. 2, 2004    (GB) .................................. 0421971.3

(51) Int. Cl.
*B60P 7/04*    (2006.01)

(52) U.S. Cl. ............... 296/98; 296/100.01; 296/100.15; 296/100.16; 296/100.17; 296/100.18; 296/101

(58) Field of Classification Search .................. 296/98, 296/100.01, 101, 100.15, 100.16, 100.18, 296/100.17

See application file for complete search history.

(56) References Cited

U.S. PATENT DOCUMENTS

| | | | |
|---|---|---|---|
| 3,549,199 A | 12/1970 | Lewis | |
| 3,841,697 A | 10/1974 | McFarland | |
| 4,050,734 A | 9/1977 | Richard et al. | |

FOREIGN PATENT DOCUMENTS

| | | | |
|---|---|---|---|
| AU | 29133 77 A | 4/1979 | |
| FR | 2 812 598 A | 2/2002 | |
| GB | 693 979 A | 7/1953 | |
| WO | WO 02/32710 A | 4/2002 | |

*Primary Examiner*—Lori L Lyjak
(74) *Attorney, Agent, or Firm*—Andrus, Sceales, Starke & Sawall, LLP (57) ABSTRACT

A sheeting system for an open-topped goods container (11) of a vehicle (10) has a cover (15) including a generally rectangular main area (32) for covering the open top and a pair of generally triangular side flaps (20) to extend down over the opposed side walls of the container. Elastic cords (26) are arranged to pull each side flap (20) to a folded position where it overlies the main area (32). A pull-cord (40) is used to move each side flap to a deployed position overlying the side of the container and then the apex (23) of the flap is tied down to a fixed point to maintain the flap in that position. To stow the cover, the side flaps (20) are released to return to their folded positions whereafter the cover (15) is wound on to a roller (18) at one end of the container (11).

25 Claims, 6 Drawing Sheets

SHEETING SYSTEM FOR OPEN-TOPPED CONTAINERS

CROSS-REFERENCE TO RELATED APPLICATIONS

This application is the U.S. national stage application of International Application PCT/GB2004/005038, filed Nov. 30, 2004, which international application was published on Jun. 16, 2005, as International Publication WO 2005/053983 in the English language. The International Application claims priority of Great Britain Patent Application 0327890.0, filed Dec. 2, 2003 and Great Britain Patent Application 0421971.3, filed Oct. 2, 2004.

This invention relates to a sheeting cover for an open-topped goods container having a generally rectangular horizontal cross-section, on a vehicle such as a truck or railway wagon. The invention further relates to a sheeting system for such an open-topped goods container and also to a vehicle whenever fitted with a sheeting system of the invention.

Tipper-trucks having open-topped goods containers are widely used for the carriage of waste materials, soil, building rubble, some farm produce and so on. In many countries it is a requirement of the legislation that when such goods are carried in open-topped containers, the open tops are sheeted over with a cover, in order to prevent inadvertent loss from the container, which otherwise could lead to environmental pollution and danger to other road users. Though it is possible to sheet a container with a simple rectangular tarpaulin of a size greater than the area of the container, by tying down the edges of the tarpaulin with ropes, that is a slow and tedious process which greatly increases the turn-round time when the container is to be loaded or unloaded.

Mechanical sheeting systems for open-topped containers are known, where a mechanism is arranged to deploy a cover over the open top of a container and to retract that cover, as and when required. A common system has a roller mounted adjacent the front end of the container, the cover being wound on the container A housing may be provided at least above and in front of the roller, to protect the cover when wound on the roller. A pair of arms is pivoted to the truck chassis, one each side of the container and approximately halfway along the length thereof, one end of the cover being attached to a bar extending between the upper ends of the arms. An hydraulic or pneumatic ram arrangement is provided to pivot the arms between a first position where the bar is adjacent the roller and a second position where the bar is adjacent the rear end of the container, movement of the arms to that second position deploying the cover over the container by unwinding the cover from the roller. The roller may be spring-urged or power driven so as to re-wind the cover on to the roller as the arms move from their second position back to their first position, so stowing the cover, or a manual crank arrangement could be provided for this purpose.

Ever tighter legislative requirements now insist on covers of the kind described above having side curtains, to prevent loss of load through gaps which inevitably occur between the long edges of the cover and the container, when the vehicle is under way. Such side curtains are normally of rectangular shape and hang down alongside the side walls of the container, there being a series of eyelets along the lower edges of the curtains. A cord is then used to tie those eyelets to suitable points on the container or truck chassis to ensure the side curtains are pulled tight and remain so during travel of the truck. When the cover is to be stowed, the side curtains must be released and then folded up to overlie the main area of the cover. This is difficult to perform without the operator climbing up on to the top of the container. Further, poor folding of the side curtains can rapidly lead to jamming of the roller re-wind mechanism. Though still easier than sheeting an open-topped container entirely manually, the use of such side curtains again greatly increases the turn-round time for the truck.

It is a principal aim of the present invention to provide a sheeting cover and also a sheeting system for an open-topped container of a vehicle such as of a truck or railway wagon, which cover allows the provision of side flaps and which is configured to allow easy deployment of the cover and also rapid return of the side flaps to a folded position, where those side flaps overlie the main area of the cover.

According to one aspect of this invention, there is provided a fabric sheeting cover for an open-topped goods container of rectangular horizontal cross-section, comprising:

a generally rectangular main area for covering the open top of the container;

and a pair of generally triangular side flaps extending one from each of two opposed side edges of the main area, each side flap being movable with respect to the main area between a folded position where the flap overlies the main area and a deployed position where the side flap extends substantially at right angles to the main area;

elastic members connecting the side flaps to the main area of the cover and arranged to pull the side flaps to their folded positions;

pull-means for each side flap and arranged when tension is applied thereto to unfold the respective side flap against the bias provided by the elastic members thereby to move the side flap to its deployed position; and tie-down means for each flap, arranged to allow the securing thereof in its deployed position.

The arrangement of sheeting cover of this invention for an open-topped container allows the container to be sheeted in a rapid and effective manner, requiring only a minimum of input by an operator, such as the truck driver. The deployment of the main area of the cover is undertaken in essentially the same manner as with existing mechanical covers and so is familiar to truck drivers, and the deployment and tying down of the triangular side flaps is fast, effective and safe to perform, as compared to the known-technique of tying down generally rectangular side flaps by threading a long line through eyelets provided on those flaps. Further, stowing of the cover is also easy and fast; the triangular side flaps retract to their folded position where they overlie the main area of the cover when the flaps are released, whereafter the cover may be re-wound on the roller.

Most preferably, the elastic members comprise elastic cords which are arranged to pull the side flaps to their folded positions and which are elastically stretched as the side flaps are moved to their deployed positions by the respective pull-members. Release of the flaps when at their deployed positions allows the flaps to return under the action of the elastic members to their folded positions overlying the main area of the cover, whereafter the cover may be stowed, exposing the open top of the container.

Each side flap may have a pair of elastic members associated therewith and each extending from a location at or adjacent the apex of the triangular flap to respective positions at or adjacent the end edges of the main area of the cover, partway between the side edges. The triangular flaps should be configured such that when folded, the apexes more or less meet along the centre line of the main area of the cover, though they could overlap to some extent, when folded. For such flaps, the ends of the elastic members may be secured to the main area of the cover at locations approximately two-thirds of the way across the cover, from the long edge to which the associated flap is connected. More than one elastic member may be provided, to ensure sufficient return force for the weight of the side flap.

For each side flap, the pull-means may comprise a flexible tension member attached to the side flap at or adjacent the apex thereof. In the alternative, the pull-means may comprise a flexible tension member running on a line extending between a first point at or adjacent the apex of the side flap and a second point adjacent the junction between the side flap and the main area of the cover, at the end of the cover for attachment to the bar extending between the arms. Such a line may comprise a wire rope the ends of which are attached to the cover at said first and second points.

In a preferred embodiment, the pull-means comprises a tension member attached to a pulley running on said line. Means may be provided to retain the pulley adjacent said second point (i.e. at the end of said line remote from the apex of the triangular side flap), other than when the cover has been deployed. This may be achieved by providing a transverse slit through the cover and through which said line extends. In the alternative, a self-jamming pulley arrangement may be employed and which is released when the tension member is pulled.

The pull-means may serve also as the tie-down means for each flap—that is to say, having been used to unfold the respective flap against the bias provided by the elastic members, the pull-means may then be tied down to a suitable point on the container or vehicle chassis, so as to hold the flap in its deployed position. Preferably, the tie-down means is separate from the pull-means and comprises a flexible tension member connected to the apex of the side flap or to the flap in the region of the apex, the tie-down means being securable to a lower part of the container or vehicle chassis. Such a tension member could be permanently attached to the apex of the side flap or the tie-down means could comprise a ring attached to the material of the cover and to which a suitable strap may be connected. In the latter case, the strap may include a rigid portion to facilitate the connection thereof to the ring, and further may include a elastically extensible portion, in order to maintain tension on the cover.

This invention extends to a sheeting system for an open-topped goods container of rectangular horizontal cross-section, comprising a sheeting cover of this invention as defined above together with means to secure the cover in juxtaposition to the container so that the main area of the cover may be extended to overlie the open top of the container with said opposed edges running substantially parallel to two opposed edges of the open top. Preferably, the securing means acts on the two opposed end edges of the main area of the cover and pulls the cover taut over the open top.

The securing means may comprise, at or adjacent one end edge of the cover, a storage device for the cover and into which the cover is stowed when not deployed over the open top of the container. Prior to that stowage, the side flaps are folded automatically to their positions overlying the main area of the cover whereafter the cover may be retracted into the storage device. Preferably, the storage device includes a roller on to which the cover is wound. The roller may be provided with a housing to protect the cover when wound on the roller. The roller may be spring-loaded or power-driven to cause rotation of the roller in the sense of winding the cover on to the roller. Alternatively, a hand-operated mechanism may be provided for winding the cover on to the roller.

The securing means may further comprise, for the other end edge of the cover, a pair of arms pivoted at one of their ends and movable between a first position where the other ends of the arms are adjacent the storage device and a second position where the other ends of the arms are at the other end of the container, the cover being connected to said other ends of the arms. A bar may extend between the other ends of the arms, the end of the cover being secured to the bar.

This invention further extends to the combination of a sheeting system of this invention as described above and an open-topped container on a vehicle such as a truck or railway wagon, the securing means for the cover comprising a storage device mounted at the forward end of the container and a pair of arms pivoted to the vehicle and arranged to extend the cover from the storage device over the open top of the container. In such a combination, the open-topped container may form a part of the vehicle or may be a separate container removable from the vehicle, as required.

By way of example only, one specific embodiment of sheeting system incorporating a sheeting cover both of this invention will now be described in detail, reference being made to the accompanying drawings in which.

Figure 1:
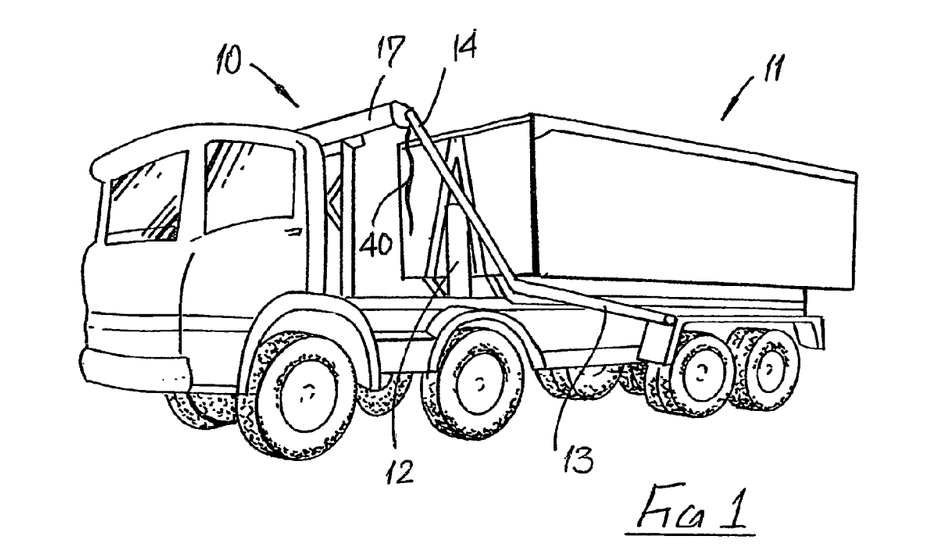
FIG. 1 is a diagrammatic view of a truck having a removable open-topped container and fitted with the sheeting system.

Referring initially to FIG. 1, there is shown a truck 10 carrying a demountable open-topped container 11. Typically, the container is wheeled and runs on rails provided on the truck chassis, the truck having an hydraulic ram arrangement 12 in order to allow the pulling of the container on to the chassis and the running of the container off the chassis, as well as tipping of the container to discharge a carried load. The invention is equally applicable to other kinds of container, trucks having permanently secured containers, and also to railway wagons when fitted with containers. Consequently, the construction of the truck and container shown in the drawings forms no part of the present invention and will not be described in further detail here.

Figure 2:
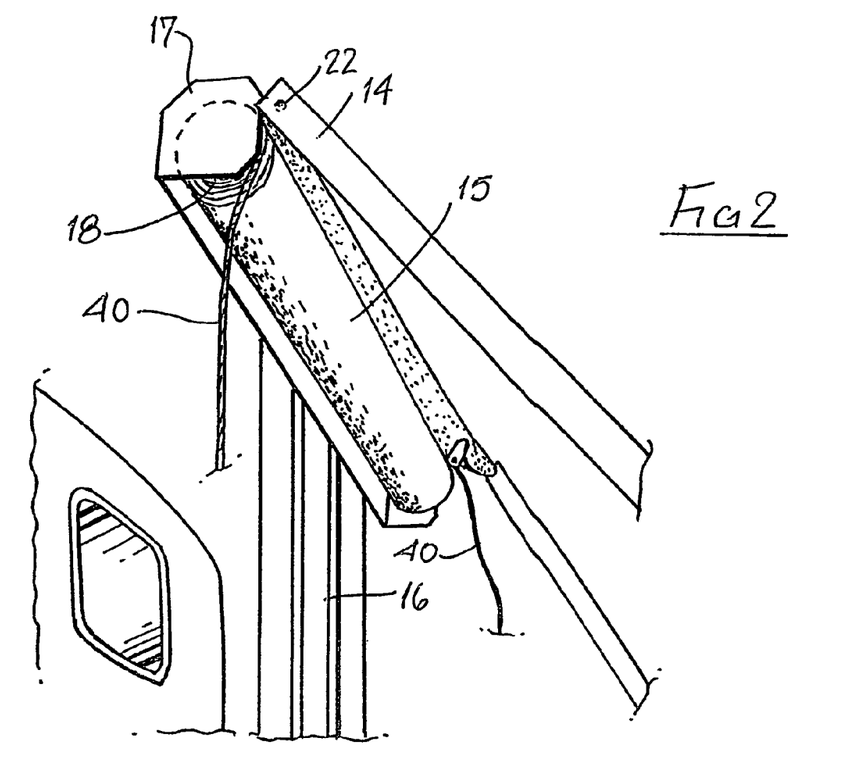
FIG. 2 is a detail view on an enlarged scale of the cover stowed on a roller, ready for deployment.
Figure 3:
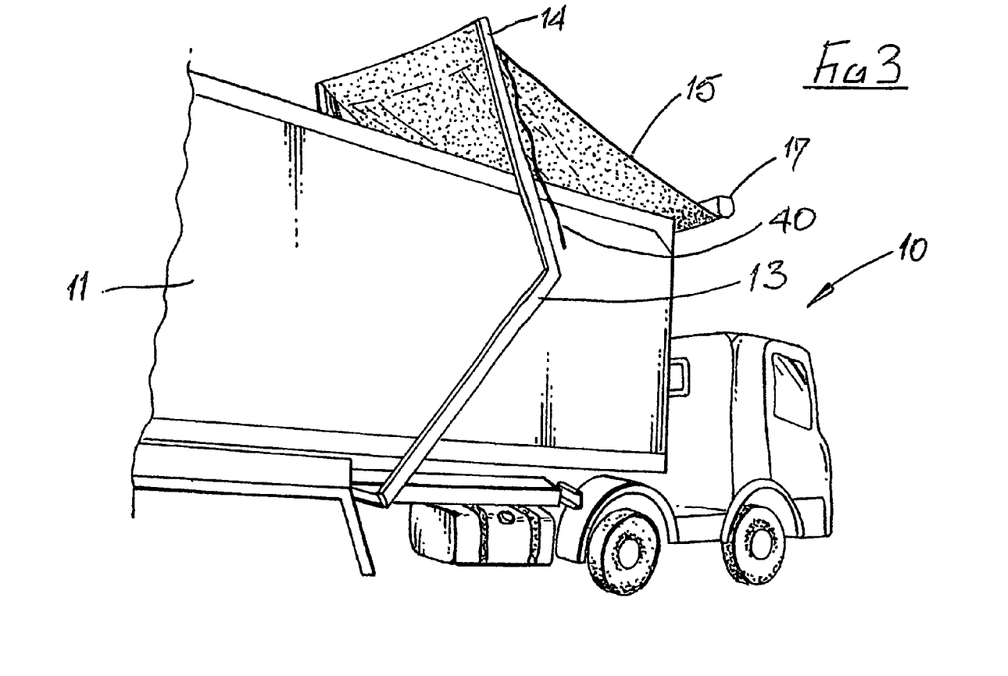
FIG. 3 illustrates the deployment of the cover.
Figure 4:
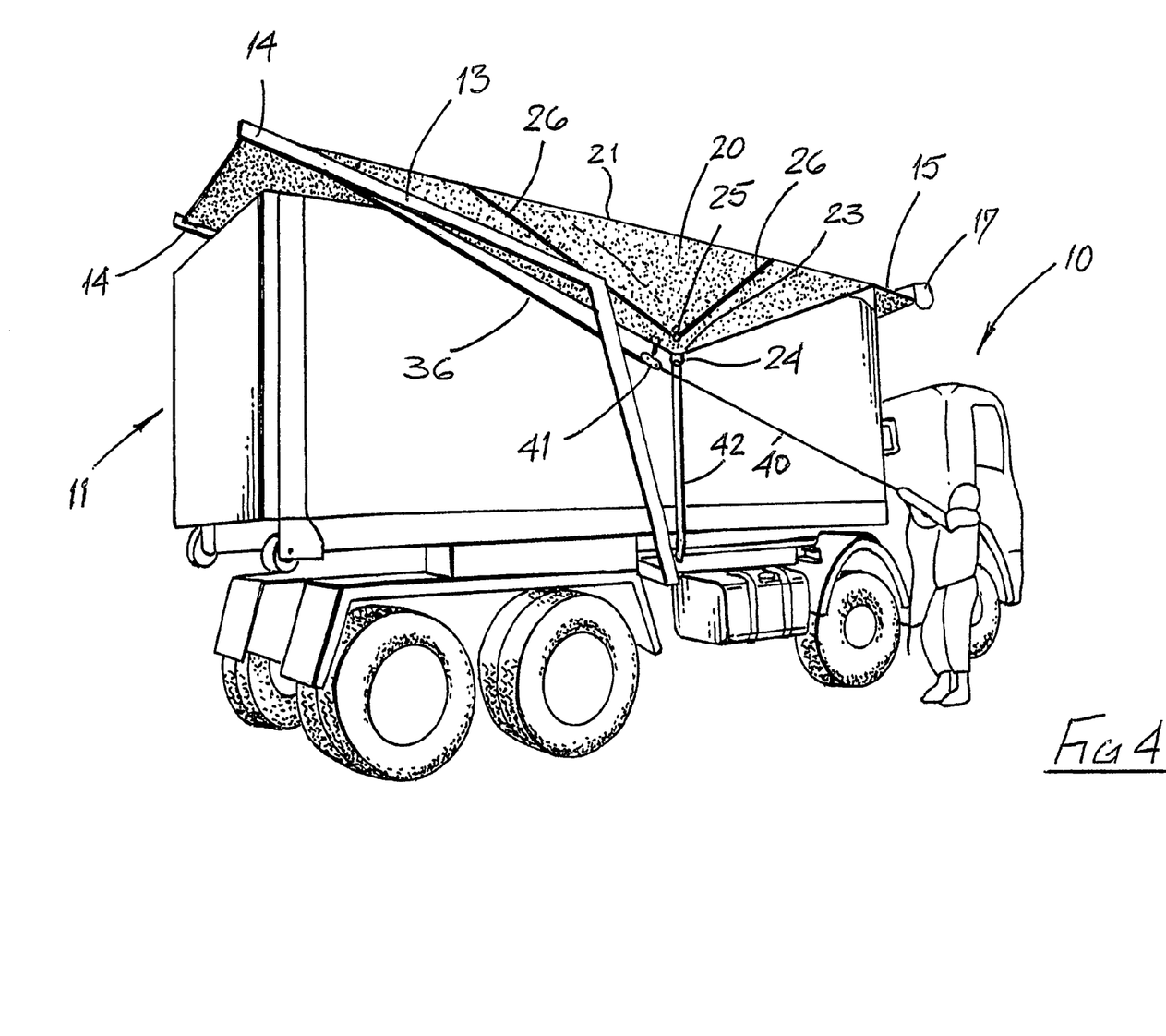
FIG. 4 shows the cover almost fully deployed and also with the side flaps being pulled down.

In order to minimise the likelihood of loss of load from the container, it is the usual practice to apply a fabric cover—such as a tarpaulin—over the open top of the container. Though this could be done wholly manually, many trucks are fitted with a semi-automatic system including a pair of side arms 13 pivoted one to each side of the truck chassis and having pneumatic rams (not shown) to effect pivoting movement of those arms from a first position shown in FIG. 1 to a deployed position shown in FIG. 4. A bar extends between the upper ends 14 of the side arms 13 and one end of the cover 15 is attached to that bar. A frame 16 supports a housing 17 within which is provided a roller 18, the cover being wound on to that roller. The roller may be spring-loaded so as to return to the position where the cover is wholly wound up thereon or a power-drive or manually-operated mechanism may be provided to effect winding rotation of the roller. From the position shown in FIGS. 1 and 2, the cover 15 is deployed by pivoting the arms 13 towards the rear of truck, so unwinding the cover from the roller as shown in FIG. 3. The arms 13 are pivoted rearwardly until the bar extending therebetween lies closely adjacent the rear end of the container and preferably just beyond and below the upper plane of the container. FIG. 4 shows the arms still a little short of that final fully-deployed position.

It is further known to provide a cover as described above with side curtains of a generally rectangular shape and which hang down from the long edges of the main area of the cover, against the sides of the container. Typically, the side curtains are relatively short as compared to the depth of the container and should have a depth of less than one half of the width of the main area of the cover. The side curtains are provided with eyelets along the lower edge, by means of which the side curtains may be tied down to cleats or eyes on the container or vehicle chassis, with a suitable cord. When the cover is to be stowed in the housing 16, the side curtains must be released and then manually folded to overlie the main area of the cover before stowage may commence, the side curtains then being rolled up with the main area of the cover.

The invention is applicable to the above-described sheeting system except that the cover of this invention does not have the kind of side curtains as described above. It is important here to note that FIGS. 1 to 4 show the embodiment of this invention, not a prior art system. The embodiment of the sheeting system of this invention will now be described in detail.

Figure 7:
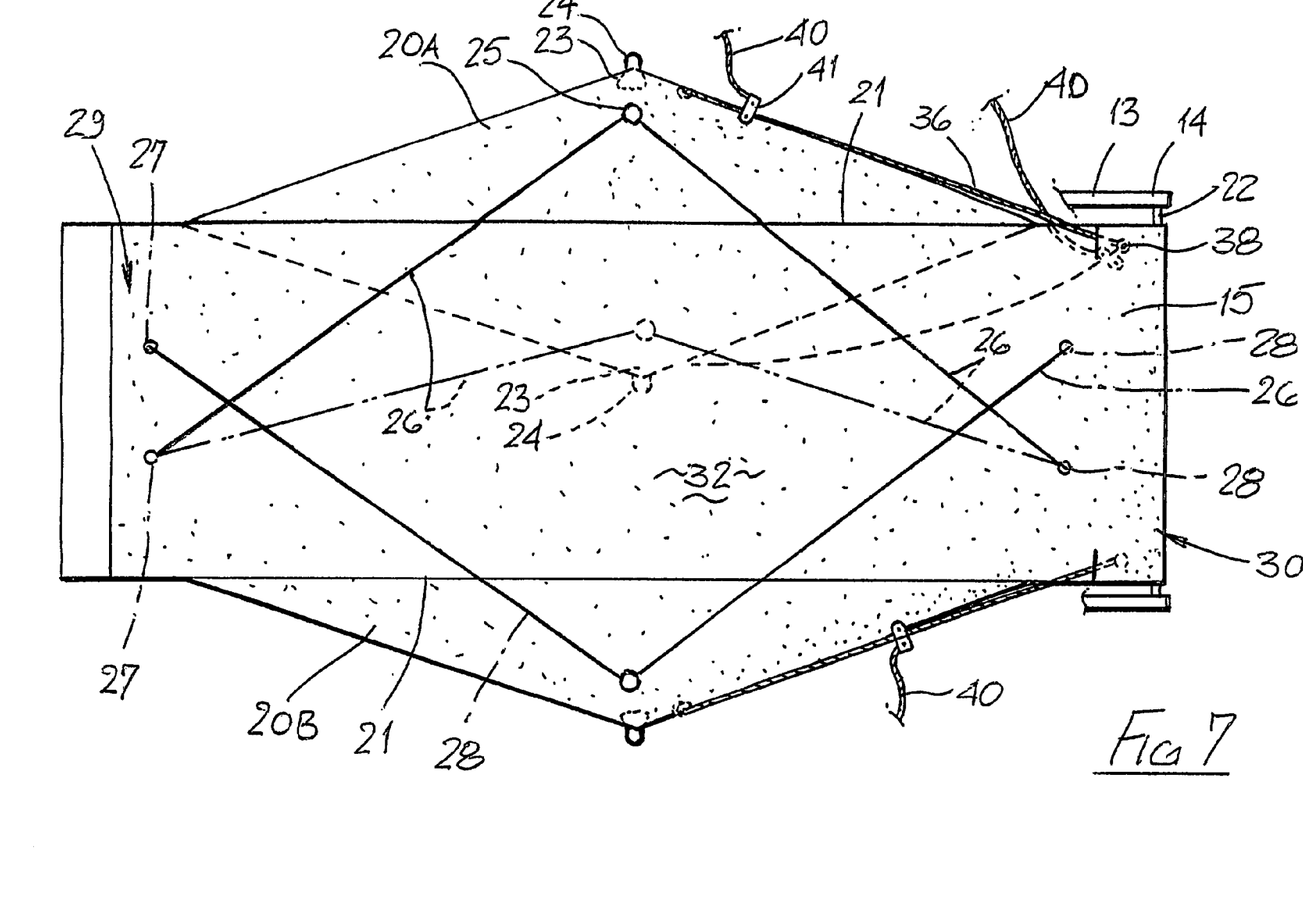
FIG. 7 is a plan view on the cover.

As best seen in FIG. 4 and 7, the cover 15 has triangular side flaps 20 provided along the long edges 21 of the cover. The side flaps may be made separately and stitched thereto, or the entire cover may be cut from a single piece of appropriate material such as a tarpaulin, a synthetic plastics-based fabric, netting or the like. The provision of a stitched seam between the main area of the cover and the side flaps (whether or not the flaps are integral with the main area) may assist the folding of the flaps along the seam-line, to overlie the main area. The length of the side flaps 20 along the main area long edges should be substantially equal to the length of the container with which the sheeting system is to be used, though the length of the main area of the cover 15 will be somewhat longer, again as shown in FIG. 7, to allow the housing 17 to be positioned forwardly of the front of the container and perhaps lower than the upper plane thereof, and for the bar 22 between the upper ends 14 of the arms 13 to be positioned to the rear of the container and perhaps below the upper plane thereof.

At the apex 23 of each triangular side flap 20 there is provided a sheeting ring 24 and inwardly of that sheeting ring there is provided an eyelet 25. For each side flap, a separate elastic cord 26 connects to the eyelet 25 of that flap and has its two ends 27, 28 secured to the main area of the cover partway across the width thereof, cord end 27 being attached adjacent the roller-end 29 of the cover and cord end 28 adjacent the bar end 30 of the cover. In each case, the connection of the cord end to the cover is approximately two-thirds of the way across the width of the cover from the side flap with which that cord is associated.

The cord 26 may connect to the eyelet 25 in any suitable manner. For example, the cord may be looped through the eyelet, the loop being locked on the other side of the cover for example by means of an enlarged knot. Another possibility would be to have the eyelet on a tab of fabric stitched to the side flap, so that the cord may simply extend through the eyelet while remaining on the same side of the side flap. Alternatively, the eyelet may be provided in the material of the side flap, the cord simply passing through the eyelet and so transferring to the other side of the flap. Either of the two last-mentioned arrangements allows the cord to self-centre with respect to the flap, by running through the eyelet as required. Yet another possibility would be directly to stitch the cord to the side flap. The ends of the cords may be secured to the main area of the cover simply by providing eyelets in the cover a the appropriate positions, passing the cord ends through the eyelets and furnishing knots on those ends to prevent the cords pulling through, or by directly stitching the cord to the cover, with reinforcement provided as required. Further, and depending on the size and weight of the side flaps, more elastic cords may be provided to give a sufficient flat-retracting force.

Each cord 26 comprises a known form of braided elastic. Typically, there will be a plurality of twisted strands of rubber encased within a braided sheath of a synthetic polyester or similar fabric. Such cords are well known in various industries and are manufactured in a wide range of diameters and spring rates. An appropriate cord may be selected having regard to the dimensions of the cover and also the material from which it is made, to ensure that the cord has sufficient strength and elasticity to perform the required function.

FIG. 7 is diagrammatic in that it shows the cover 15 stretched out in one plane, but in use the side flaps 20 either will be folded to overlie the main area 32 of the cover or will be unfolded so as to overlie the sides of the container, and so extending at right angles to the main area. The upper side flap 20A shown in FIG. 7 in solid lines is in its unfolded position (though in one plane as mentioned above), and in broken lines 33 in its folded position, overlying the main area 32 of the cover. The cord 26 associated with that flap 20A is stretched when the side flap is in its unfolded position, the stretched cord being shown in long chain lines 34. The cord is contracted when the flap is folded over the main area 32, the contracted cord being shown by long chain lines 35. In the case of the lower flap 20B, this is shown only in the unfolded (but in one plane) position. The length and characteristics of each elastic cord should be selected so that when the flap is folded over, there is only a small tension in the cord and so that when the flap is unfolded, the cord has sufficient strength to pull the flap back to the folded position.

Each flap 20 is provided with a respective steel wire 36 which extends from a position 37 adjacent the apex 23 of the flap to a further position 38 adjacent the bar end 30 of the cover 15, near the side edge of the flap. A transverse slit 39, reinforced as necessary, is provided from the side edge of the main area 32 of the cover, the steel wire being secured to the underside of the cover at position 38 but passing through that slit 39 so as then to lie above the cover. When the side flaps 20 are unfolded to their deployed position, the steel wires 36 are more or less in tension, but as can be seen from the upper flap 20A in FIG. 7, when the flaps are in their folded positions, there is essentially no tension in those wires.

Figure 5:
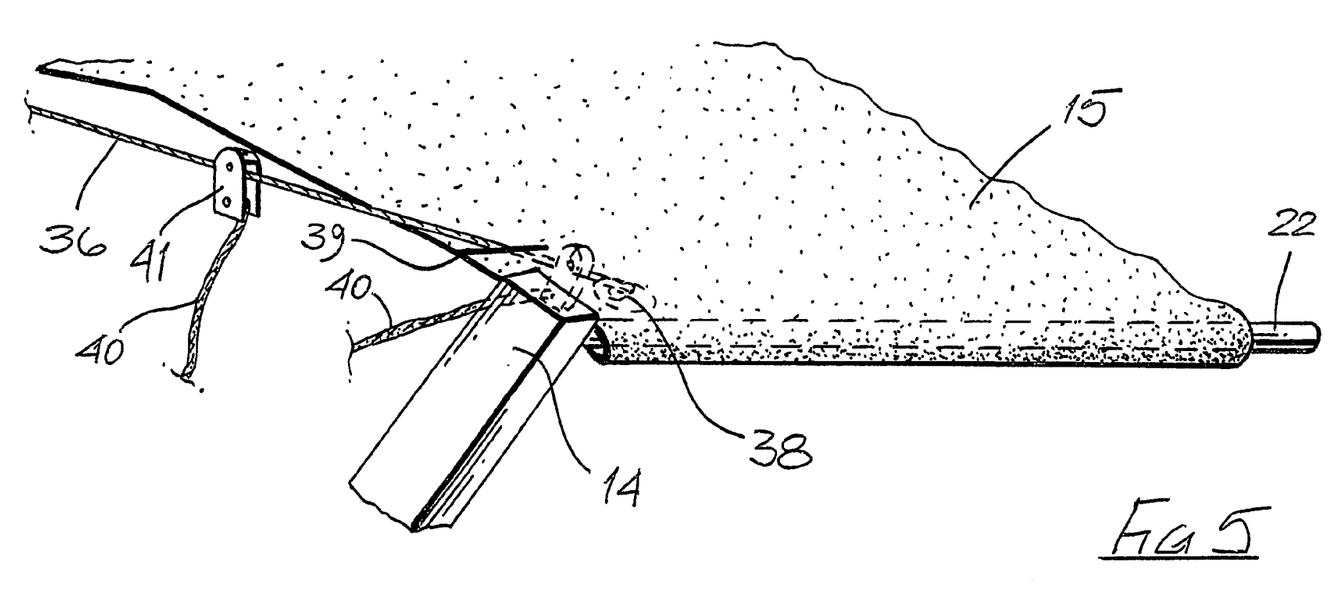
FIG. 5 is a detail view on the end portion of the cover remote from the stowage roller.

A pull-cord 40 is connected to each steel wire 36 by a pulley 41, so as to allow the pull-cord to run along the length of the wire. The pull-cord itself should have a sufficient length to allow an operator easily to grasp the lower end of that pull-cord during deployment of the cover 15. When the cover is to be stowed, the pull-cord is pulled in the appropriate direction so that the pulley 41 runs along the wire to be adjacent the further position 38, below the main area 32 of the cover, as shown in FIGS. 5 and 7. The pull-cord is thus not involved in the winding process of the cover 15, with the folded flaps, on to the roller 18 as the cover is stowed. When the cover has been deployed, the pull-cord may be grasped and pulled to move the pulley towards position 37, near the apex 23 of the side flap. In doing this, as illustrated in FIG. 4, the side flap is unfolded against the force provided by the elastic cords 26. Instead of a pulley 41, a simple slide-ring may be provided.

When the main area 32 of the cover 15 has been fully deployed and the side flaps 20 pulled down completely, it would be possible then to secure the pull-cords 40 to an appropriate part of the container or the truck chassis so as to hold the side flaps in the deployed position. However, the downward force adjacent the apex 23 of the side flap also pulls on the bar end 30 of the cover but not the roller end 29 so tending to allow the part of the side flap between the apex 23 and the roller end to loosen. As such, it is preferred to provide a separate tie-down 42 for the side flap, connected to the sheeting ring 24 at the apex 23 of the side flap, though the lower end of the pull-cord should still be made fast.

Figure 6:
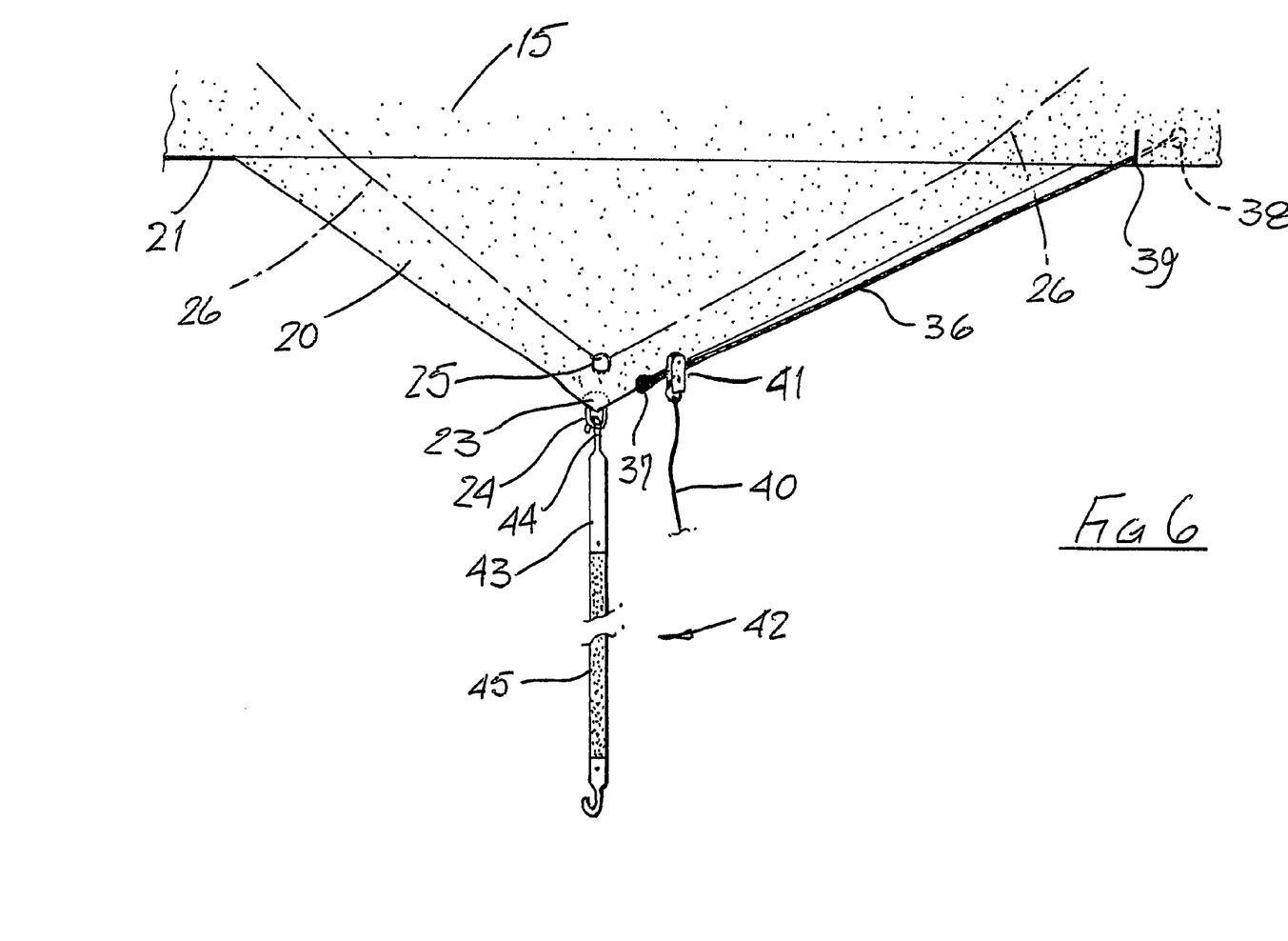
FIG. 6 illustrates the pulling down of the side flaps of the cover and also the securing of those side flaps in the pulled-down condition.

Such a tie-down is illustrated in FIGS. 4 and 6. The tie-down 42 has a rigid stem 43 provided with a hook 44 at one end for connection to the sheeting ring 24, the rigid stem having a sufficient length to facilitate the connection of the hook to the ring by an operator standing on the ground. The other end of the rigid stem 43 is connected to an elastic strap 45 also provided with a hook at the other end, whereby that strap may be hooked on to a suitable component on the container or the truck chassis. Alternatively, a simple flexible strap such as of webbing could be provided without a hook at its end remote from the rigid stem 43, for tying down or connection to a ratchet tensioner provided on the container or truck chassis. Yet another possibility would be to provide a rubber strap, to maintain tension on the side flap despite some settling of the cover as a vehicle travels.

Figure 8:
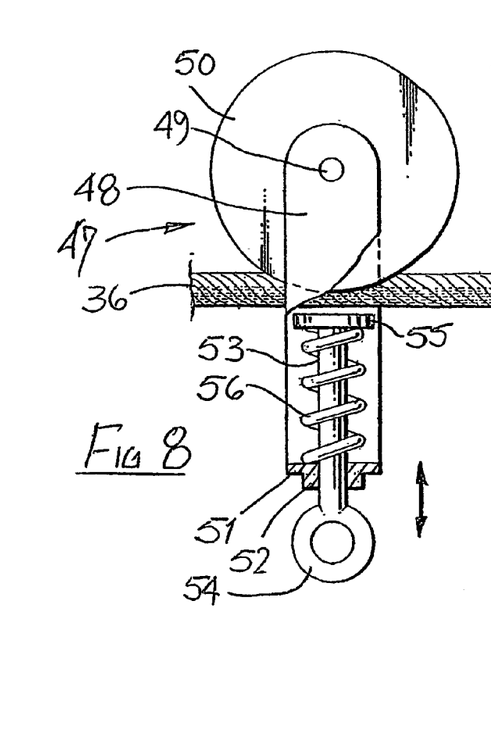
FIG. 8 shows a pulley for use with the pull-down cord, the frame of the pulley being partially cut away for clarity.
Figure 9:
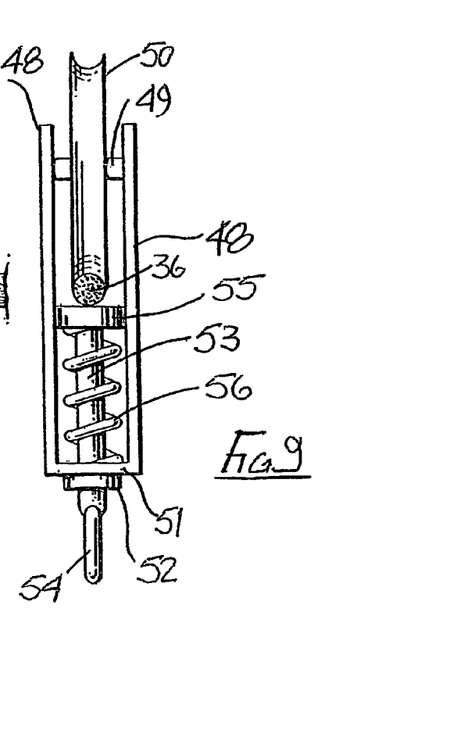
FIG. 9 is an end view of the pulley of FIG. 8.

The prime objective behind the transverse slits 39 is to trap the pulleys 41 in the position adjacent the bar end 30 of the cover 15, as the cover is being stowed by being wound on the roller 18. However, the transverse slits are likely to weaken the cover unless sufficient reinforcement is provided in that area of the cover but that increases the manufacturing cost. An alternative procedure would be to provide a pulley 47 as shown in FIGS. 8 and 9 which self-jams against the wire 36 along which the pulley runs. By using such a pulley, the transverse slits 39 may be eliminated and the wire may run solely on the lower side of the cover 15, or along an edge of the side flap.

The pulley 47 as shown in FIGS. 8 and 9 has a pair of side cheeks 48 between which extends a spindle 49 carrying a rotatable sheave 50. The sheave has a grooved periphery to accommodate the wire 36. A bridge 51 extends between the two side cheeks 48 in which is slidably mounted a rod 53 having an eye 54 at its end external to the side cheeks. Internally between the side cheeks, the rod 53 carries a jamming plate 55, a compression spring 56 acting between the bridge 51 and the plate 55, to urge the plate into engagement with the wire 36. The plate 55 could be profiled to fit closely against the wire 36, and further may have teeth, serrations or some other formations to enhance friction between the plate and the wire.

The pull-cord 40 is attached to the eye 54. When no tension is applied to that pull-cord, the spring 56 urges the plate 55 into engagement with the wire 36 so as to resist rolling movement of the pulley 47 along the wire. When the pulley is to be moved along the wire, the pull-cord 40 is tugged and initially this lifts the plate 55 away from the wire against the force provided by the spring 56 and thereafter continued pulling will permit easy movement of the pulley.

The invention claimed is:

1. A fabric sheeting cover for a goods container having an open top of rectangular horizontal cross-section, said cover comprising:
    a generally rectangular main area for covering the open top of the container and having two opposed side edges;
    a pair of generally triangular side flaps extending one from each of the two opposed side edges of the main area, each side flap being movable with respect to the main area between a folded position where the flap overlies the main area and a deployed position where the side flap extends substantially at right angles to the main area;
    elastic members connecting the side flaps to the main area of the cover and arranged to pull the side flaps to their folded positions;
    pull-means for each side flap and arranged when tension is applied thereto to unfold the respective side flap against the bias provided by the elastic members thereby to move the side flap to its deployed position; and
    tie-down means for each flap, arranged to allow the securing thereof in its deployed position.

2. A sheeting cover as claimed in claim 1, wherein the elastic members comprise elastic cords which pull the side flaps to their folded positions and which are elastically stretched as the side flaps are moved to their deployed positions.

3. A sheeting cover as claimed in claim 2, wherein each side flap has a pair of elastic members associated therewith extending from a location at or adjacent the apex of the triangular flap to respective positions at or adjacent the end edges of the main area of the cover and part-way between the side edges.

4. A sheeting cover as claimed in claim 3, wherein the pair of elastic members associated with each side flap comprises a single continuous extensible elongate elastic cord the ends of which are secured to said respective positions at or adjacent the end edges of the main area and part-way between the side edges, the central region of the cord acting on the side flap at or adjacent the apex thereof.

5. A sheeting cover as claimed in claim 4, wherein the central region of the cord is connected to an eye attached to the side flap at or adjacent the apex thereof.

6. A sheeting cover as claimed in claim 1, wherein the pull-means comprises a flexible tension member attached to the side flap at or adjacent the apex thereof.

7. A sheeting cover as claimed in claim 1, wherein the pull-means comprises a flexible tension member running on a line extending between a first point at or adjacent the apex of the side flap and a second point adjacent the junction between the side flap and the main area of the cover.

8. A sheeting cover as claimed in claim 7, wherein said line comprise a wire rope the ends of which are attached to the cover at said first and second points.

9. A sheeting cover as claimed in claim 8, wherein the pull-means comprises a flexible tension member having a pulley at one end thereof, the pulley running on said line.

10. A sheeting cover as claimed in claim 9, wherein the pulley has a brake mechanism which automatically locks to said line to resist movement of the pulley along the line but which is released when tension is applied to the tension member.

11. A sheeting cover as claimed in claim 7, wherein a respective transverse slit is formed through the cover for each line, the line extending through the associated slit such that the tension member transfers from one side of the cover to the other on passing through said slit.

12. A sheeting cover as claimed in claim 1, wherein the tie-down means comprises a connector for a tension member, provided at or adjacent the apex of each flap.

13. A sheeting cover as claimed in claim 12, wherein the connector comprises a ring attached to the material of the cover.

14. A sheeting cover as claimed in claim 1, wherein the tie-down means includes, for each side flap, a flexible tension member connected to the apex of the side flap and which is securable to a lower part of the container or vehicle chassis.

15. A sheeting system as claimed in claim 14, wherein the flexible tension member is elastically extensible.

16. A sheeting system for an open-topped goods container of rectangular horizontal cross-section, comprising a sheeting cover as claimed in claim 1 in combination with means to secure the cover in juxtaposition to a container so that the main area of the cover may be extended to overlie the open top of the container with said opposed edges running substantially parallel to two opposed edges of the open top.

17. A sheeting system as claimed in claim 16, wherein the securing means acts on the two opposed end edges of the main area of the cover.

18. A sheeting system as claimed in claim 17, wherein the securing means comprises, at or adjacent one end edge of the cover, a storage device for the cover into which the cover may be stowed by allowing the side flaps to move to their folded positions overlying the main area of the cover and then retracting the cover to the storage device.

19. A sheeting system as claimed in claim 18, wherein the storage device includes a roller on to which the cover is wound.

20. A sheeting system as claimed in claim 19, wherein the roller is provided with one of a spring-loaded mechanism, a power-driven mechanism or a manually-operated mechanism to cause rotation of the roller in the sense of winding the cover on to the roller.

21. A sheeting system as claimed in claim 18, wherein the securing means for the cover further includes a pair of arms pivoted at one of their ends and movable between a first position where the other ends of the arms are adjacent the storage device, and a second position where the other ends of the arms are at the other end of the container, the cover being connected to said other ends of the arms.

22. A sheeting system as claimed in claim 21, wherein a bar extends between said ends of the arms and the cover is attached to said bar.

23. A sheeting system as claimed in claim 16, in combination with an open-topped container on a vehicle, the securing means for the cover comprising a storage device mounted at the forward end of the container and a pair of arms pivoted to the vehicle and arranged to extend the cover from the storage device over the open top of the container.

24. The combination of claim 23, wherein the container is removable from the truck, as required.

25. The combination of claim 23, wherein the cover is formed from one of a tarpaulin, a synthetic fabric or a netting material.

* * * * *